US 8,254,379 B1

(12) United States Patent
Mangal

(10) Patent No.: US 8,254,379 B1
(45) Date of Patent: Aug. 28, 2012

(54) METHOD AND SYSTEM FOR APPLICATION BASED COMPRESSION PROFILE SELECTION

(75) Inventor: Manish Mangal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 988 days.

(21) Appl. No.: 10/891,667

(22) Filed: Jul. 15, 2004

(51) Int. Cl.
*H04L 12/56* (2006.01)
(52) U.S. Cl. ......... 370/389; 370/229; 370/477; 370/521
(58) Field of Classification Search .................. 370/229, 370/230, 230.1, 236, 349, 389, 392, 471, 370/477, 521
See application file for complete search history.

(56) References Cited

U.S. PATENT DOCUMENTS

| | | | | |
|---|---|---|---|---|
| 5,987,022 A * | 11/1999 | Geiger et al. | ................. | 370/349 |
| 6,519,636 B2 * | 2/2003 | Engel et al. | ................. | 709/223 |
| 6,754,221 B1 * | 6/2004 | Whitcher et al. | ............ | 370/401 |
| 6,882,637 B1 * | 4/2005 | Le et al. | ......................... | 370/349 |
| 6,967,964 B1 * | 11/2005 | Svanbro et al. | ............... | 370/437 |
| 7,010,329 B2 * | 3/2006 | Livet et al. | .................... | 455/574 |
| 7,058,728 B1 * | 6/2006 | Eklund | ........................... | 709/247 |
| 7,068,992 B1 * | 6/2006 | Massie et al. | ................. | 455/403 |
| 7,212,511 B2 * | 5/2007 | Jonsson et al. | ................ | 370/336 |
| 7,283,474 B1 * | 10/2007 | Bergenwall | .................... | 370/235 |
| 7,296,083 B2 * | 11/2007 | Barham et al. | ................ | 709/232 |
| 7,328,027 B1 * | 2/2008 | Mangal | ......................... | 455/453 |
| 7,512,716 B2 * | 3/2009 | Pelletier et al. | ............... | 709/247 |
| 7,978,673 B1 * | 7/2011 | Uhlik et al. | .................... | 370/341 |
| 2002/0143966 A1 * | 10/2002 | Sibecas et al. | ............... | 709/229 |
| 2004/0044781 A1 * | 3/2004 | Hymel et al. | ................ | 709/229 |
| 2004/0090989 A1 * | 5/2004 | Kobayashi | .................... | 370/469 |
| 2004/0120357 A1 * | 6/2004 | Kekki | ............................ | 370/521 |
| 2004/0160920 A1 * | 8/2004 | Bi et al. | ......................... | 370/335 |
| 2004/0247993 A1 * | 12/2004 | Johnson et al. | ................. | 429/50 |
| 2004/0252671 A1 * | 12/2004 | Lee et al. | ....................... | 370/349 |
| 2004/0264433 A1 * | 12/2004 | Melpignano | .................. | 370/349 |
| 2005/0018666 A1 * | 1/2005 | Davila et al. | ................... | 370/389 |
| 2005/0130653 A1 * | 6/2005 | Bisdikian et al. | ........... | 455/432.3 |
| 2005/0165949 A1 * | 7/2005 | Teague | ........................... | 709/236 |
| 2005/0259591 A1 * | 11/2005 | Moore et al. | ................... | 370/252 |
| 2006/0002426 A1 * | 1/2006 | Madour | ......................... | 370/477 |
| 2006/0160543 A1 * | 7/2006 | Mashinsky | ................. | 455/452.2 |
| 2007/0004469 A1 * | 1/2007 | Arimitsu | ........................ | 455/574 |

OTHER PUBLICATIONS

C. Bormann et al., "RObust Header Compression (ROHC): Framework and four profiles: RTP, UDP, ESP, and uncompressed," Request for Comments 3095, Jul. 2001.
L-E. Jonsson et al., "RObust Header Compression (ROHC): A Link-Layer Assisted Profile for IP/UDP/RTP," Request for Comments 3242, Apr. 2002.
T. Koren et al., "Enhanced Compressed RTP (CRTP) for Links with High Delay, Packet Loss and Reordering," Request for Comments 3545, Jul. 2003.

* cited by examiner

Primary Examiner — Kwang B Yao
Assistant Examiner — Nguyen Ngo

(57) ABSTRACT

In establishing a data connection with a wireless wide area network, a wireless device may evaluate one or more factors in order to select between IP header compression methods to be used for traffic in the data connection between the wireless device and an access point for the wireless wide area network. For example, the wireless device may select the IP header compression method based on a remaining battery level of the wireless device, a type of application on the wireless device initiating the data connection or another factor. In one embodiment, the selection of the IP header compression method may also be based on an amount of available bandwidth for the access point to allocate to wireless devices.

14 Claims, 7 Drawing Sheets

METHOD AND SYSTEM FOR APPLICATION BASED COMPRESSION PROFILE SELECTION

FIELD OF THE INVENTION

This invention relates generally to transmission of data in a wireless wide area network. More specifically, it relates to systems and methods for selecting compression methods used by a wireless device in transmitting data over a connection with wireless network.

BACKGROUND OF THE INVENTION

A wireless device may establish a data connection with a wireless wide area network ("WWAN"), which the wireless device can then use for packet-based voice or data services. The wireless device may use various different protocols for communicating in the data session, such as the Internet Protocol ("IP"), Voice over IP ("VoIP"), the Transmission Control Protocol ("TCP") or others. Since the air interface between the wireless device and an access point for the WWAN is typically a limiting factor in the speed of the data communications, the wireless device may also use one or more compression methods to compress data sent over the air interface.

In order to efficiently utilize the air interface, there exists a need for improved methods and systems for selecting data compression methods for communications in a data connection with a wireless network.

SUMMARY OF THE INVENTION

In initiating a data connection with a wireless network, such as a wireless wide area network, a wireless device may select between different Internet Protocol header compression methods to be used during the data connection for traffic between the wireless device and an access point for the wireless wide area network. The selection of the IP header compression method may be based on one or more different factors. In one embodiment, the selection of the IP header compression method is based on the remaining battery power in the wireless device.

In another embodiment, the selection of the IP header compression method is based on a type of application running on the wireless device that initiated the data connection. In alternate embodiments, the wireless device and a network element involved in establishing the data connection may jointly evaluate factors to determine which IP header compression method to select. For example, in receiving a request from a wireless device to initiate a data connection, the network element may first evaluate the remaining bandwidth left to allocate to wireless devices. If the remaining bandwidth is below a predetermined threshold, then the network element may direct the wireless device to use an IP header compression method that provides a relatively higher level of IP header compression than other available IP header compression methods. If the remaining bandwidth is not below the predetermined threshold, then the network element may allow the wireless device to choose the IP header compression method based on one or more factors, such as the remaining battery level of the wireless device, a type of application executing on the wireless device that requested the data connection or another factor.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Introduction

Figure 1:
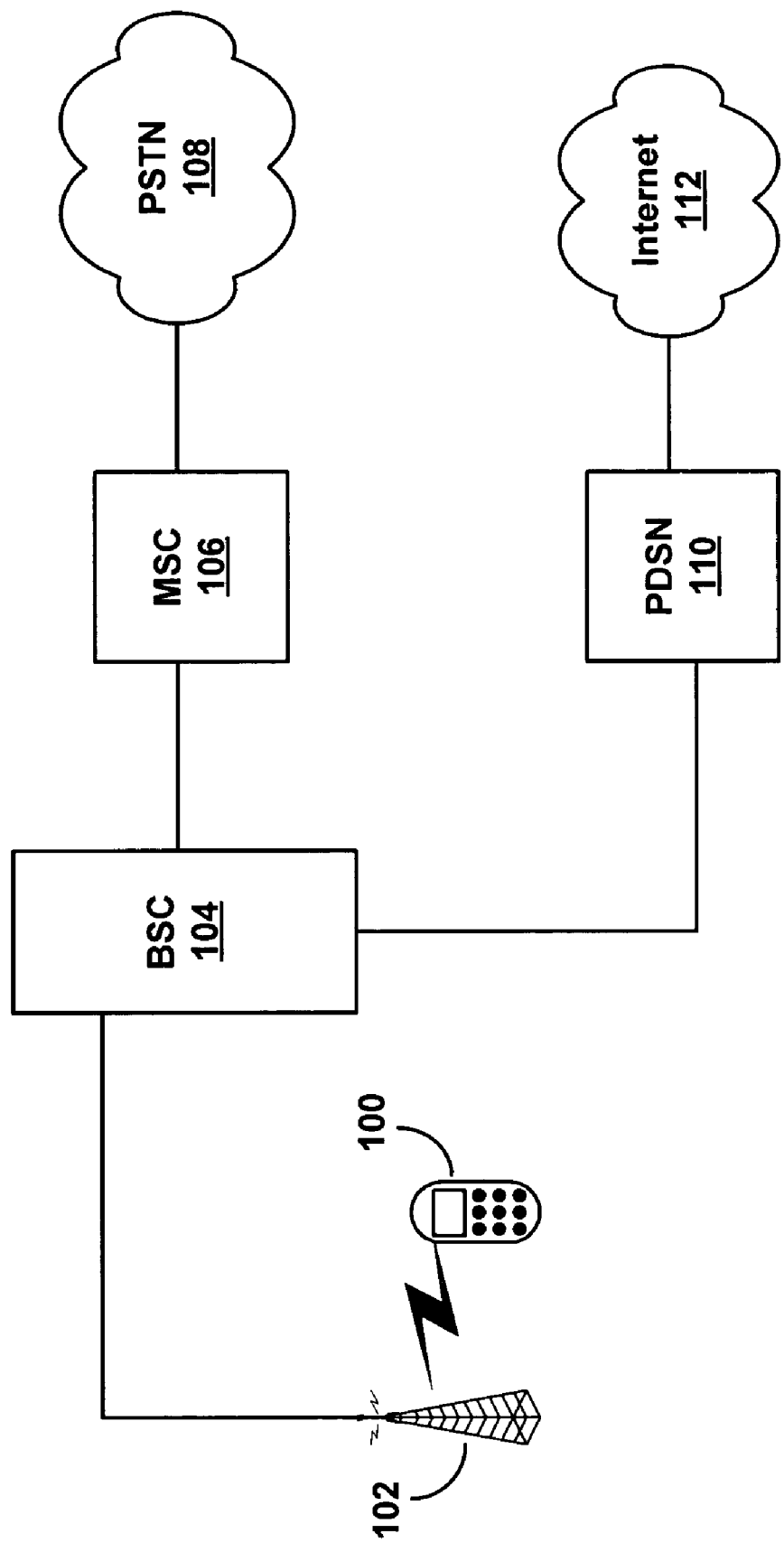
FIG. 1 illustrates an exemplary architecture of a wireless wide area network that can allow a wireless device or a network element to selectively choose between compression methods used in data communications between the wireless device and the wireless wide area network.

A wireless device can establish a data connection with a WWAN for packet-based services, such as voice or data services. Various different packet-based protocols, such as IP or VoIP, can then be used to send data wirelessly between the wireless device and an access point for the WWAN as part of the data connection. In establishing the data connection with the WWAN, the wireless device can select between various IP header compression methods, which may then be used to compress the headers of IP packets subsequently sent between the wireless device and the access point as part of the data connection.

The wireless device may use different criteria to select between the available IP header compression methods. In one embodiment, the wireless device selects between first and second IP header compression methods based on the remaining battery level in the wireless device. However, in other embodiments the wireless device may select between more than two IP header compression methods. If the remaining battery level is above a predetermined threshold, then the wireless device might select the first IP header compression method, which may be a more efficient IP header compression method than the second IP header compression method but might also be more computationally intensive and therefore deplete the wireless device's battery more quickly. If the remaining battery level is not above the predetermined threshold, then the wireless device might select the second IP header compression method, which might not be as efficient as the first IP header compression method but also might not be as computationally intensive and therefore not drain the wireless device's battery as quickly.

In another embodiment, the wireless device may select between the first and second IP header compression methods based on the application running on the wireless device that initiated the request to establish the data connection, although the wireless device might alternatively select from more than two IP header compression methods. For example, if the application is a VoIP application, the wireless device might select one IP header compression method. However, if the application is a web browsing application, then the wireless device might select a different IP header compression method. The respective IP header compression methods associated with applications can be specified based on may different criteria, such as the real-time or non-real-time nature of the application, operational characteristics of the WWAN or other factors.

In yet another embodiment, the access point for the WWAN may select between the IP header compression methods based on the unused RF capacity of the access point, such as the remaining bandwidth left to allocate to wireless devices, and instruct the wireless device accordingly. In one embodiment, if the unused RF capacity is below a predetermined threshold, then the access point can select the first IP header compression method for use in the data connection. The first IP header compression method may be the more efficient of the available IP header compression methods, thereby minimizing the amount of data sent over the air interface. If the unused RF capacity is not below the predetermined threshold, then the access point may allow the wireless device to select between the IP header compression methods, such as by using or more of the previously described factors. In other embodiments a network element other than an access point, such as a base station controller, a mobile switching center or another element associated with the wireless wide area network, may select between the available IP header compression methods.

2. Exemplary Architecture

FIG. 1 illustrates an exemplary architecture of a wireless wide area network that can allow a wireless device or an access point to selectively choose between compression methods used in communications between the wireless device and the wireless wide area network. The wireless device 100 may be a mobile phone, a personal digital assistant ("PDA"), a wirelessly equipped computer, a two-way radio or another type of wireless device. While FIG. 1 depicts one wireless device 100 accessing the WWAN for voice and/or data services, the WWAN may alternatively simultaneously provide service to a plurality of different wireless devices. Additionally, while the discussion herein refers to WWANs, it should be understood that wireless networks other than WWANs might alternatively be used.

As shown in FIG. 1, the wireless device 100 communicates with an access point for the WWAN, such as a base station 102, through an air interface. The wireless device 100 can communicate with the base station 102 using a variety of different air interface protocols. In an exemplary embodiment, the wireless device 100 communicates with the base station 102 using CDMA. CDMA provides a method for sending wireless signals between the wireless device 100 and the base station 102. In a CDMA system, the base station 102 communicates with the wireless device 100 over a spread spectrum of frequencies.

In a CDMA system, multiple wireless devices may use the same frequency range, and the multiple wireless devices may each simultaneously communicate with the base station 102 using the same frequency range. A wireless device in a CDMA system spreads its signal across the frequency range. Spreading the signal across a wide bandwidth can reduce interference between signals from different wireless devices. In order to perform signal spreading, each wireless device may be assigned a unique code, such as a Walsh code, to be used for modulating communications. The code may be a sequence of bits, such as a 64 bit binary number; however, other lengths may also be used. This can allow individual signals to be differentiated from other signals, and, therefore, accurately recovered.

CDMA is described in further detail in Telecommunications Industry Association ("TIA") standards IS-95A and IS-95B, which are both incorporated herein by reference in their entirety. CDMA is also described in the International Telecommunications Union ("ITU") EMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

CDMA is merely one example of a protocol that can be used for communication between the wireless device 100 and the access point 102. As other examples, the wireless device 100 and the access point 102 may communicate using Wideband CDMA ("WCDMA"), Time Division-Synchronous CDMA ("TD-SCDMA"), Advanced Mobile Phone Service ("AMPS"), Digital AMPS ("D-AMPS"), Global System for Mobile Communication ("GSM"), IS-136, Wireless Application Protocol ("WAP"), time division multiple access ("TDMA") or other protocols. Additional wireless protocols such as any of the various protocols under the IEEE 802.11 umbrella, Bluetooth and others may also be used.

The base station 102 couples to a base station controller ("BSC") 104, which can perform various functions such as managing handoffs of the wireless device 100 as it moves among base stations in the WWAN or in other wireless networks. The BSC 104 in turn connects to a mobile switching center ("MSC") 106. The MSC 106 can manage setup and teardown of connections with the wireless device 100. While the BSC 104 and the MSC 106 are depicted as separate components, it is possible that their functionality may be combined into a single component. The MSC 106 can additionally provide connectivity to the public switched telephone network ("PSTN") 108. Through this connectivity, the wireless device 100 may access the WWAN for voice services and in turn establish a circuit switched connection with another device on the PSTN 108, the WWAN or another network.

While a traditional voice connection with the WWAN might involve establishing a circuit-switched connection between the wireless device 100 and another entity for voice communications, the wireless device 100 might alternatively establish a data connection with the WWAN in order to engage in packet-switched communications with another entity. In addition to interfacing with the MSC 106 and in turn the PDSN 108, the BSC 104 may also interface with a packet data serving node ("PDSN") 110. The PDSN 110 can provide connectivity to a packet-switched network, such as the Internet 112, an intranet or another packet-switched network.

Using this connectivity, the wireless device 100 can establish a data connection with the WWAN and engage in packet-based communications with devices on a packet switched network, such as the Internet 112. For example, the wireless device 100 might use various protocols to engage in data communications with another device. The wireless device 100 might also use packet based voice protocols such as VoIP to engage in voice communications with another device via the wireless device's data connection with the WWAN.

In accessing the WWAN for data services, the wireless device 100 may establish a Point-to-Point. Protocol ("PPP") session with the PDSN 110. As is known in the art, PPP can be used as a data link protocol for communication between two devices. PPP can provide a method for framing data sent between the two devices. Additionally, it can implement a link control protocol for controlling transmission links between the two devices, and it can provide a way to negotiate higher level protocol options for communication between the two devices. PPP is described in more detail in Internet Engineering Task Force ("IETF") Request for Comments ("RFCs") 1661, 1662 and 1663, all of which are incorporated herein by reference in their entirety.

While the wireless device 100 may communicate with the PDSN 110 through a PPP session, it may communicate with other devices (e.g., a device on the Internet 112) using higher level protocols. For example, the wireless device 100 may use the Transmission Control Protocol ("TCP")/Internet Protocol ("IP") suite. TCP/IP is one protocol suite that may be used for transmitting data over a packet-switched network. IP provides a method for transmitting data between devices on the same or on different networks. TCP is a connection-oriented protocol used to send data between devices connected over a network, and it provides additional features over IP, such as reliable end-to-end transmission of data. When used in conjunction, TCP and IP provide a format for breaking a data message into packets, transmitting the packets over the network to a receiver, and reassembling the packets at the receiver to form the original data message.

Each device may be assigned an IP address, which is generally 32-bits long. The IP address assigned to a device is usually globally unique, and therefore allows data be routed between different networks to a particular device. Data to be transmitted between devices is placed into an IP packet. The IP packet can include a header portion and a data portion. The header portion generally identifies a source device and a destination device, while the data portion carries the data to be transmitted between the two devices.

Figure 2:
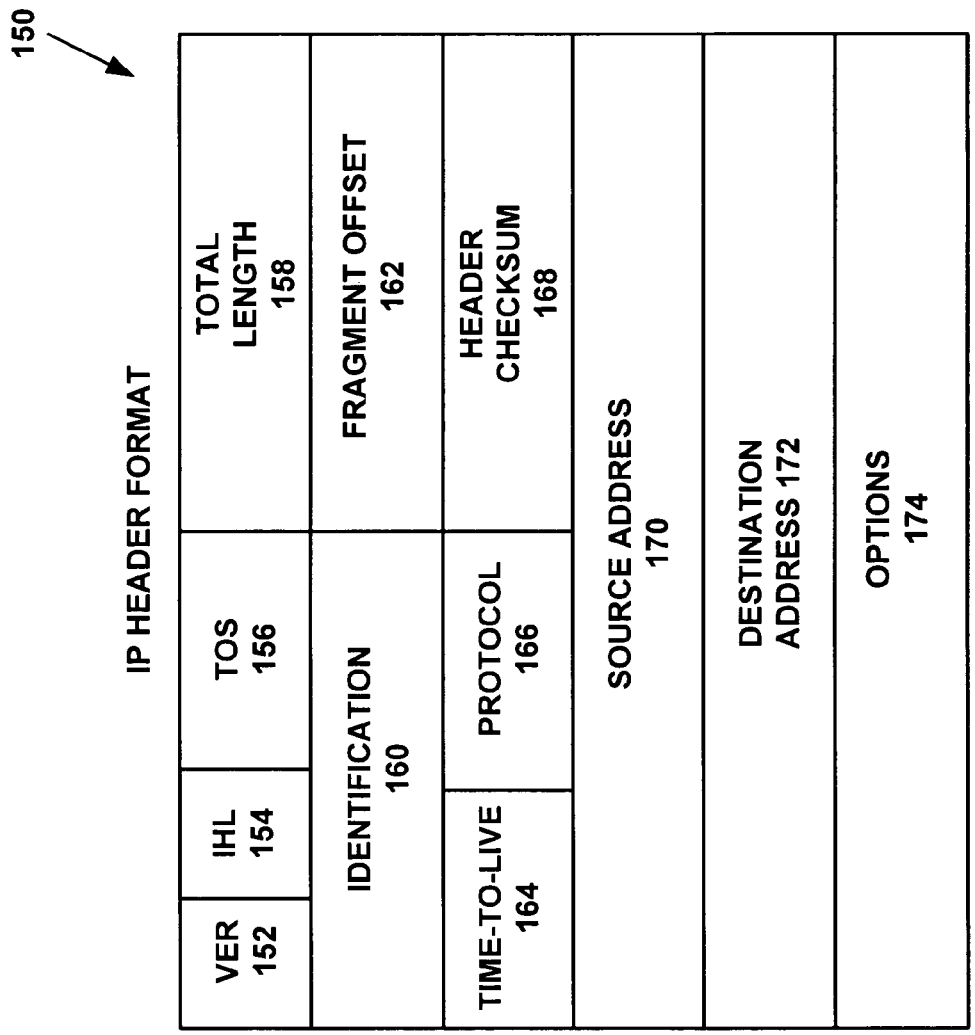
FIG. 2 is a block diagram illustrating an IP packet header.

FIG. 2 is a block diagram illustrating an IP packet header. The IP packet header 150 includes a number of different fields. The version field 152 can indicate an IP version, such as IPv4 or IPv6. The Internet Header Length ("IHL") field 154 can indicate the length of the header. The Type-of-Service ("ToS") field 156 can indicate a requested type of service. The total length field 158 can indicate the length of everything in the IP packet, including the IP header 150. The identification-field 160 may be used for packet fragmentation. The fragment offset field 162 can also be used for packet fragmentation. The Time-To-Live ("TTL") field 164 can be a hop count, which is used to limit the lifetime of the IP packet.

The protocol field 166 can indicate a protocol used with the IP packet. For example, TCP, User Datagram Protocol ("UDP"), Encapsulating Security Payload ("ESP"), and Authentication Header ("AH") are common protocols that may be used in conjunction with IP. Other protocols may be used as well. The header checksum field 168 can be used to verify the contents of the IP packet header 150. The source address field 170 may include a source IP address for a sending device, and the destination address field 72 may include a destination IP address for a receiving device. The options field 174 can be used for security, source routing, error reporting, debugging, time stamping or other information. IP data may be carried in the IP packet data portion, which generally appended below the options-field 174.

The IP packet is sent over the network, and, using the IP address in the destination address field 172 of the IP packet header 150, appropriately routed to the destination device. The packet may travel through different devices and across different networks before ultimately reaching its destination. The IP address can help to provide accurate routing through one or more networks and one or more intermediate devices to the intended destination device.

IP, however, does not provide a mechanism to assure that packets will be received at their intended destination. They may be lost during transmission due to data corruption, buffer overflow, equipment failure or other problems. TCP complements IP by ensuring reliable end-to-end transmission of the packets. Among other functions, TCP handles lost or corrupted packets, and it reassembles packets that arrive at their destination out of order. IP is described in more detail in IETF RFC 791, which is incorporated herein by reference in its entirety. TCP is described in more detail in IETF RFC 793, which is incorporated herein by reference in its entirety.

TCP/IP is one method for sending data between two devices, and other Internet or network protocols may also be used. For example, the User Datagram Protocol ("UDP") may be used in conjunction with IP to exchange data between devices. UDP provides a connectionless protocol for exchanging data between devices, such as devices connected over an IP network. UDP does not guarantee reliable transmission between the devices, and it provides only minimal error protection. UPD is described in further detail in IETF RFC 768, which is incorporated herein by reference in its entirety.

Another protocol that may be used for communication between the two devices is Mobile IP, which is an extension of IP. An IP address is usually associated with one particular IP sub-network. A wireless device may connect to the WWAN and be assigned a particular IP address; however, during a communication session the wireless device 100 might roam to different access points in the WWAN that are on different IP sub-networks, or the wireless device may roam to different networks. Mobile IP is an extension of the IP protocol that allows a mobile node to transparently move between different IP sub-networks and still receive data addressed to the IP address associated with the mobile node's home network.

Mobile IP is described in more detail in the Internet Engineering Task Force Request for Comment 2002, "IP Mobility Support," C. Perkins, October 1996, which is incorporated herein by reference in its entirety. Mobile IP is also described in more detail in Internet Engineering Task Force Request for Comments 2003-2005, which are each incorporated herein by reference in their entirety.

When the wireless device 100 sends and receives IP packets in a data connection with the WWAN, the IP header is typically a large portion of the overall IP packet size. The data rate of the wireless device 100 in a data connection with the WWAN is generally limited by the air interface. Depending on the particular network configuration, the air interface may even be more limited in one direction than the other. For example, many WWANs provide a greater bandwidth in the forward direction (e.g., from the BTS 102 to the wireless device 100) than in the reverse direction (e.g., from the wireless device 100 to the BTS 102). Thus, the corresponding data rate may be greater in the forward direction than the reverse direction.

Therefore, there is an incentive to reduce the number of bits that are sent between the wireless device 100 and the BTS 102 over the air interface. One way to reduce the number of bits transmitted over the air interface is through data compression. Various data compression methods might be applied to communications over the air interface. For example, the data carried in the data portion of an IP packet may be compressed. Compressing the data reduces the number of bits used to represent the data carried in the IP packet and thereby also reduces the number of bits that must be transmitted over the air interface.

Another method for reducing the number of bits transmitted over the air interface is to compress the header of IP packets. This reduces the size of the IP packet header and thereby also the number of bits that are transmitted over the air interface. Various different compression methods might be used to compression the header of an IP packet. Two common standards for compressing IP packet headers are Robust Header Compression ("ROHC") and Enhanced Compressed RTP ("EcRTP"). While the discussion herein describes these two particular standards, it should be understood that other compression methods might also be used.

ROHC and EcRTP provide two different methods for compressing IP packet headers each with its own characteristics. ROHC is generally more efficient than EcRTP. In operation, ROHC may compress an IP packet header to 0 bytes where the header is not even needed anymore in the IP packet. However, EcRTP may only compress IP packet headers to approximately 1 or 2 bytes. The actual level of compression achieved by either of these standards will generally vary depending on the particular implementation of the standard and depending on the configuration and various operational characteristics of the WWAN.

While ROHC is generally more efficient in compressing IP packet headers, it is also a more complex compression method than EcRTP. Since ROHC is more computationally intensive that EcRTP, it therefore requires more processing resources by the wireless device 100 in order to compress IP packets sent to the BTS 102 and to decompress IP packets received from the BTS 102. In a wireless device 100, utilization of processing resources is directly related to battery consumption. The more processing that a wireless device 100 performs, the more of its remaining battery power is consumed. Accordingly, a wireless device 100 that uses ROHC may deplete its battery or other power source more quickly than a wireless device that uses EcRTP.

ROHC is described in more detail in Internet Engineering Task Force Request for Comment 3095, "RObust Header Compression (ROHC): Framework and four profiles: RTP, UDP, ESP, and uncompressed," Bormann et al., July 2001. ROHC is also described in more detail in Internet Engineering Task Force Request for Comments 3242, "RObust Header Compression (ROHC): A Link-Layer Assisted Profile for IP/UDP/RTP," Jonsson et al., April 2002. EcRTP is described in more detail in Internet Engineering Task Force Request for Comment, "Enhanced Compressed RTP (CRTP) for Links with High Delay, Packet Loss and Reordering," Koren et al., July 2003.

3. Exemplary Operation

Figure 3:
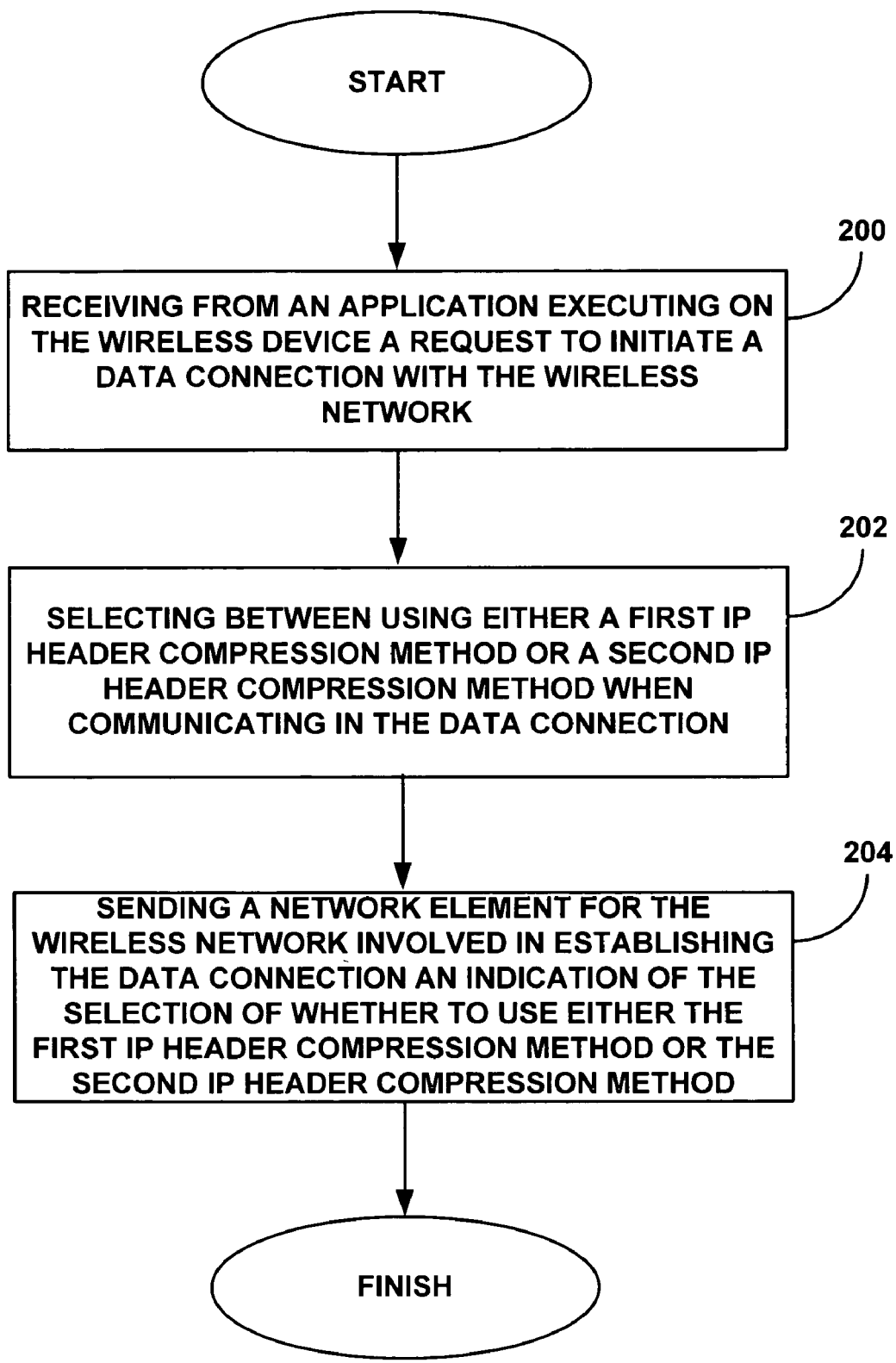
FIG. 3 is a flowchart of an exemplary method for a wireless device to select between IP header compression methods used in communicating with an access point for a wireless wide area network, such as the wireless wide area network of FIG. 1.

FIG. 3 is a flowchart of an exemplary method for a wireless device to select between IP header compression methods used in communicating with an access point for a wireless wide area network, such as the wireless wide area network of FIG. 1. At Step 202, the wireless device receives from an application executing on the wireless device a request to initiate a data connection with the wireless wide area network. At Step 204, the wireless device selects between using a first IP header compression method or a second IP header compression method when communicating in the data connection. This selection may be based on one or more factors, such as the type of application requesting the data connection, the remaining battery level of the wireless device or other factors. In alternative embodiments, the wireless device may select between more than two different IP header compression methods.

At Step 204, the wireless device sends a network element for the wireless network involved in establishing the data connection an indication of the selection of whether to use the first IP header compression method or the second IP header compression method. For example, after receiving from the application executing on the wireless device the request to initiate the data connection with the wireless, the wireless device may in turn begin communicating with the access point in order to establish the requested data connection. As part of the data connection setup, the wireless device may then notify the access point of the wireless device's selection to use either the first IP header compression method or the second IP header compression method. The data connection may then be established to use the IP header compression method that was directed by the wireless device.

Depending on the particular wireless wide area network configuration, a network entity other than the access point might be involved in establishing the data connection. For example, a base station controller, a mobile switching center or another network element might be involved in establishing the data connection. The wireless device might accordingly notify one of these elements of the wireless device's selection to use either the first or second IP header compression method.

In alternate embodiments, this method might be used to select between compression methods other than IP header compression methods. For example, the wireless device might select between available compression methods for compressing the headers of packets other than IP packets. As another example, the wireless device might select between available compression methods for compressing the data portions of IP packets or of the data portions of packets other than IP packets. These are merely examples, and the wireless device might also select between other compression methods as well. These selections may be in addition to or in place of the selection of an IP header compression method, and these selections may also be based on one more factors such as the remaining battery level of the wireless device, the type of application initiating the data connection or still other factors.

Figure 4:
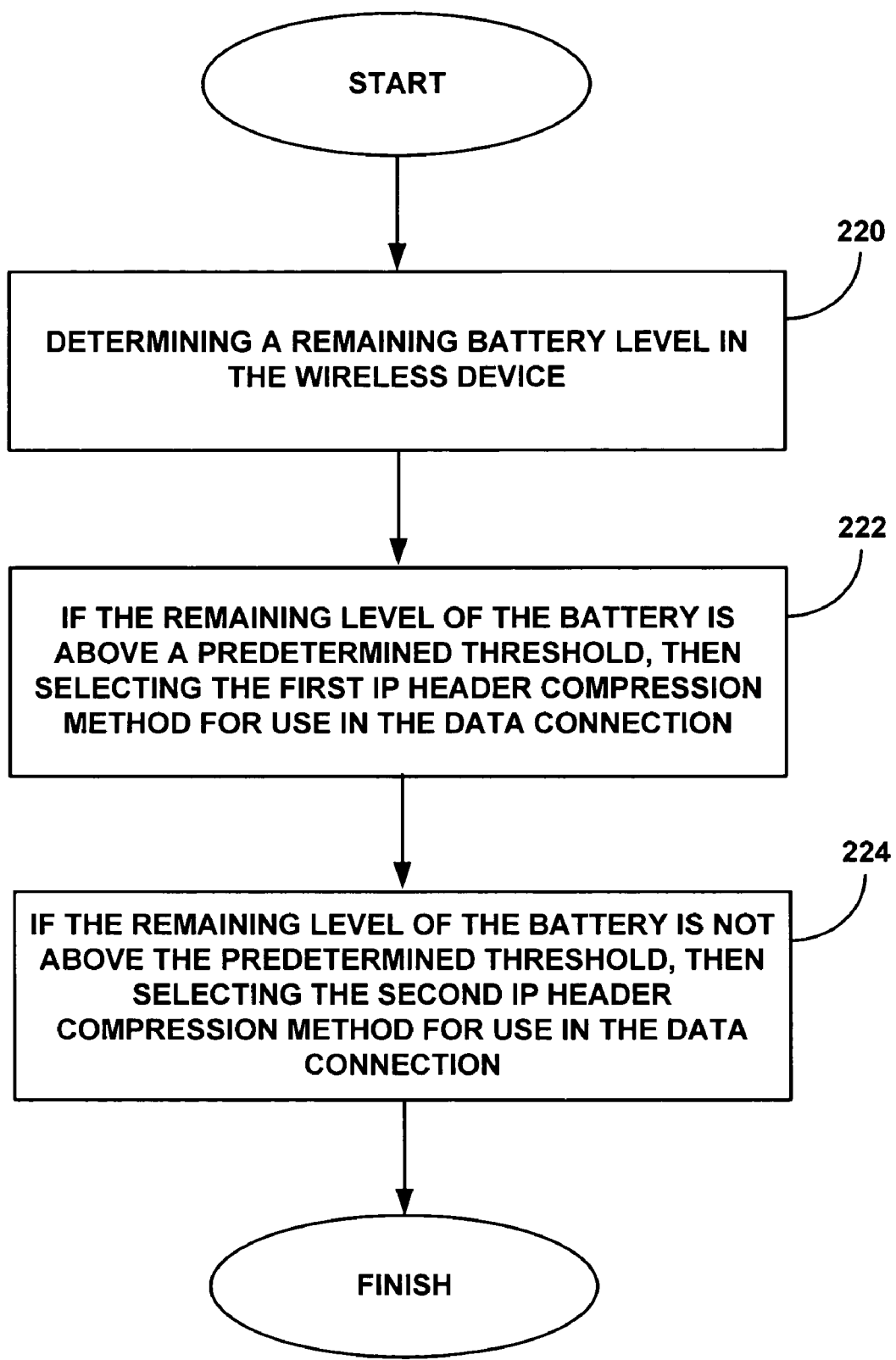
FIG. 4 is a flowchart of an exemplary method for a wireless device to select between using either the first IP header compression method or the second IP header compression method based on a remaining battery level.

FIG. 4 is a flowchart of an exemplary method for a wireless device to select between using either the first IP header compression method or the second IP header compression method based on a remaining battery level. This method may be used in conjunction with the method depicted in FIG. 3, such as at Step 202 when the wireless device selects between the first and second IP header compression methods. In this method, the first IP header compression method provides a higher level of compression than the second IP header compression method. For example, the first IP header compression method may be ROHC, while the second IP header compression method may be EcRTP. These are merely examples, and other compression methods might also be used.

At Step 220, the wireless device determines a remaining battery level in the wireless device. If the remaining level of the battery is above the predetermined threshold, then the wireless device selects the first IP header compression method for use in the data connection, as shown at Step 222. If the remaining battery level is not above the predetermined threshold, then the wireless device selects the second IP header compression method for use in the data connection, as shown at Step 224. Thus, if the remaining battery level is above the predetermined threshold, then the wireless device selects the more efficient of the two IP header compression methods. Otherwise, the wireless device selects the less efficient of the two IP header compression methods.

As previously described, the efficiency of an IP header compression method is generally correlated with its usage of processing resources in the wireless device. Since a more efficient IP header compression method generally requires more processing resources, it would also consume more battery power. In this method then, the wireless device selects the more efficient IP header compression method when the remaining battery level is sufficiently high (e.g., above the predetermined threshold). Where the remaining battery level is not sufficient high (e.g., not above the predetermined threshold), the wireless device may advantageously conserve resources by selecting the less efficient IP header compression method.

The predetermined threshold may be specified in a variety of different manners. For example, the predetermined threshold may be preprogrammed into a wireless device, such as by the manufacturer of the wireless device. Thus, the predetermined threshold may already be set when a user purchases the wireless device. In one embodiment, the predetermined threshold is not later alterable by the user of the wireless device. Thus, only the manufacturer would be able to specify the predetermined threshold.

In another embodiment, however, the user of the wireless device may alter the predetermined threshold. For example, the user may select a particular battery level (e.g., a remaining percentage of the battery or a remaining number of minutes of the battery) to serve as the predetermined threshold. This may be done, for instance, through a user interface of the wireless device. Once the user specifies the new predetermined threshold, it is then used as a basis for selecting between using the first or second IP header compression methods. Other variations of specifying the predetermined threshold are also possible.

In other embodiments, the user might not select a specific predetermined threshold but rather might select between more generic operational characteristics of the wireless device. For example, the user may be able to select between "maximum battery conservation" and "maximum bandwidth conservation" options. The maximum battery conservation option might correspond to always selecting the less efficient IP header compression method that uses less processing resources and therefore consumes less battery power. The maximum bandwidth conservation option might correspond to always selecting the more efficient IP header compression method that uses less bandwidth but requires more processing resources and therefore consumes more battery power.

It is also possible that the user may select options between these absolute options. For example, the user may interact with software on the wireless device in order to adjust a slide bar or other such mechanism to select among intermediate options. Thus, the user may balance the tradeoffs between using a more efficient IP header compression method to conserve bandwidth and using a less efficient IP header compression method to conserve battery power. The user's selection (e.g., the position of the slide bar between the two absolute options) may then correspond to a higher or lower predetermined threshold that more adequately achieves the user's desired objective.

For example, a selection closer to the option of conserving bandwidth may correspond to a relatively lower predetermined threshold. The lower predetermined threshold would cause the wireless device to more often select the more efficient first IP header compression protocol, which would conserve bandwidth while using more processing resources and battery power. Conversely, a selection closer to the option of conserving battery power may correspond to a relatively higher predetermined threshold. This would in turn cause the wireless device to more often select the less efficient second IP header compression protocol, which would use less processing resources and require less battery power.

Figure 5:
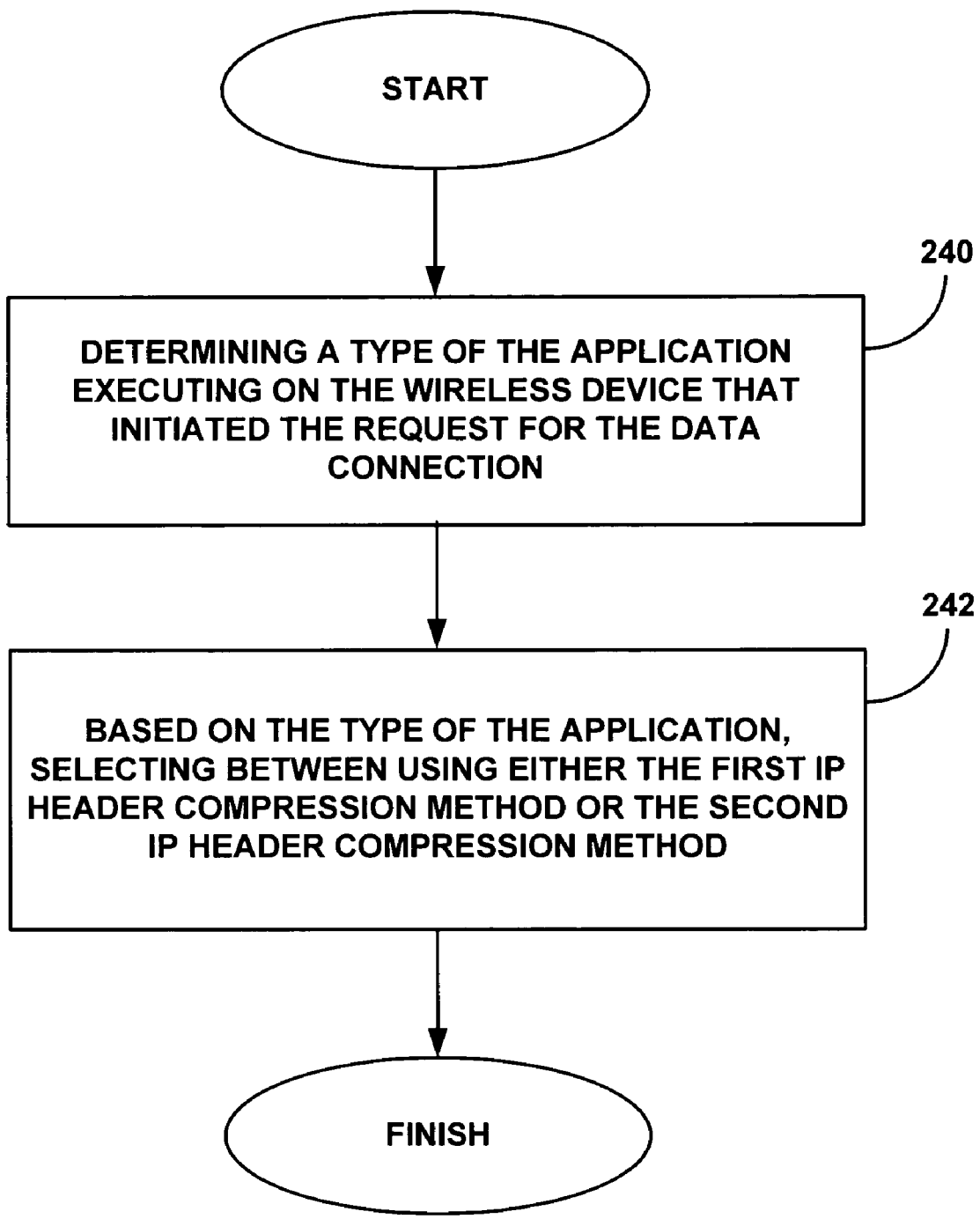
FIG. 5 is a flowchart of an exemplary method for a wireless device to select between using either the first IP header compression method or the second IP header compression method based on a type of application initiating the data connection.

FIG. 5 is a flowchart of an exemplary method for a wireless device to select between using either the first IP header compression method or the second IP header compression method based on a type of application initiating the data connection. This method may also be used in conjunction with the flowchart of FIG. 3, such as at Step 202 where the wireless device selects between using the first or second IP header compression methods. In this method, the type of application requesting the data connection with the WWAN is used a basis for selecting between using the first and second IP header compression methods in the data connection, and the first IP header compression method provides a higher level of compression than the second IP header compression method.

At Step 240, the wireless device determines a type of the application executing on the wireless device that initiated the request for the data connection. For example, a user of the wireless device might invoke a web browsing application in order to browse various web pages on the Internet or on another network. The application might execute on the wireless device and, in order to access the Internet or other network, the application might request a data connection with the WWAN. In another example, the user might invoke a voice application, such as a VoIP application, in order to engage in a voice call with another device. The application might then execute on the wireless device and request a data connection with the WWAN in order to place the call. These are merely examples, and many other types of applications may run on the wireless device and request a data connection with the WWAN.

At Step 242, based on the type of the application, the wireless device selects between using either the first IP header compression method or the second IP header compression method. For example, in VoIP communications it is oftentimes desirable that packets arrive at their destination in a timely manner and are not lost. Lost or delayed packets in VoIP communications may result in a choppy call or even outages during the call. This would also generally be the case for other real-time applications, such as other voice, video or audio applications. Therefore, it may be advantageous to use a more efficient IP header compression method during VoIP communications in order to reduce the required bandwidth and speed transmission of the VoIP packets, thereby adequately supporting the real-time nature of these communications. Thus, when the application is a VoIP application, the wireless device may select the more efficient first IP header compression method.

Web browsing and file downloading applications, however, are generally not subject to the same real-time constraints of VoIP or other such voice, video or audio applications. Therefore, it may be preferable to use a less efficient IP header compression method with these types of applications in order to allow for a more efficient utilization of processing resources in the wireless device and conservation of battery power. Thus, when the application is a web browsing or file downloading application, the wireless device may select the less efficient second IP header compression method.

It should be understood, however, that these types of applications are merely exemplary in nature. The wireless device may execute a variety of different types of applications, and these other types of applications may also serve as a basis for selecting between the first and second IP header compression methods or even other IP header compression methods supported by the wireless device. Additionally, a variety of different factors may be used to select which IP header compression method corresponds to a particular type of application. Accordingly, different users, device manufacturers or others configuring wireless devices might select different IP header compression methods that correspond to a particular type of application. For example, some users might configure their devices to use one type of IP header compression method for VoIP applications, while other users might configure their devices to use another type of IP header compression method for VoIP applications. Still other variations are possible.

Figure 6:
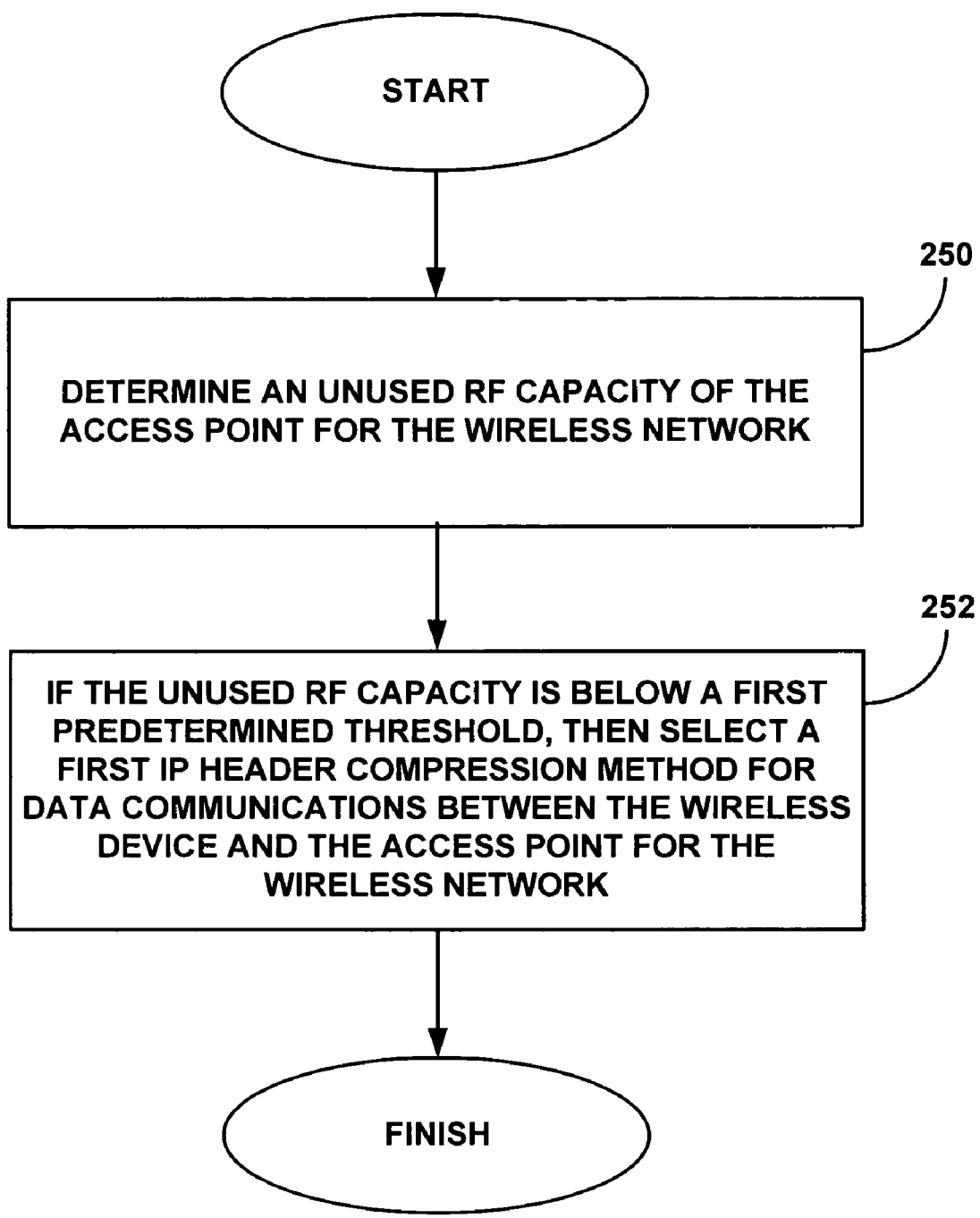
FIG. 6 is a flowchart of an exemplary method for selecting between first and second IP header compression methods used in data communications between a wireless device and an access point for a wireless network based on an unused RF capacity of the access point.

FIG. 6 is a flowchart of an exemplary method for selecting between first and second IP header compression methods used in data communications between a wireless device and an access point for a wireless network based on an unused RF capacity of the access point. In the method, the first IP header compression method provides a higher level of compression than the second IP header compression. That is, the IP header would generally be compressed more when using the first IP header compression method than it would if the second IP header compression method were used. The method might be performed by various network entities, such as an access point, a base station controller, a mobile switching center or another network element involved in establishing a connection with the wireless device.

At Step 250, the network element determines an unused RF capacity of the access point for the wireless network. For example, the RF capacity might be the remaining bandwidth that the access point has left to allocate to wireless devices. Other measures of the unused RF capacity are also possible. The network element itself might store the unused RF capacity, in which case the access point could determine this information directly. Alternatively, another element in the wireless wide area network might store the unused RF capacity and in turn provide this information to the network element.

At Step 252, if the unused RF capacity is below a first predetermined threshold, then the network element selects the first IP header compression method for data communications between the wireless device and the access point. The predetermined threshold is preferably stored in the network element; however, it might alternatively be specified at another location within the wireless wide area network and in turn obtained by the network element. Once the network element selects the particular IP header compression method, it can then inform the wireless device of this selection during the negotiations between the two elements in order to establish the data connection. And, after agreeing on the particular IP header compression method, the wireless device and access point can use the agreed method for subsequent communications via the air interface.

Since the first IP header compression method provides a higher level of compression than the second IP header compression method, it will generally compress IP packets header more and therefore reduce the amount of data send over the air interface. Thus, when the unused RF capacity is low (e.g., below the first predetermined threshold), the network element can reduce the amount of data sent over the air interface by selecting the more efficient IP header compression method for use during the data connection. On the other hand, if the unused RF capacity is high (e.g., not below the first predetermined threshold), then the network element may select the second IP header compression method. In an alternate embodiment, if the unused RF capacity is not below the first predetermined threshold, then the network element may allow the wireless device to select between the first and second IP header compression methods, such as by using one or more of the previously described factors of the remaining battery level of the wireless device, the type of application initiating the data connection, or others.

Figure 7:
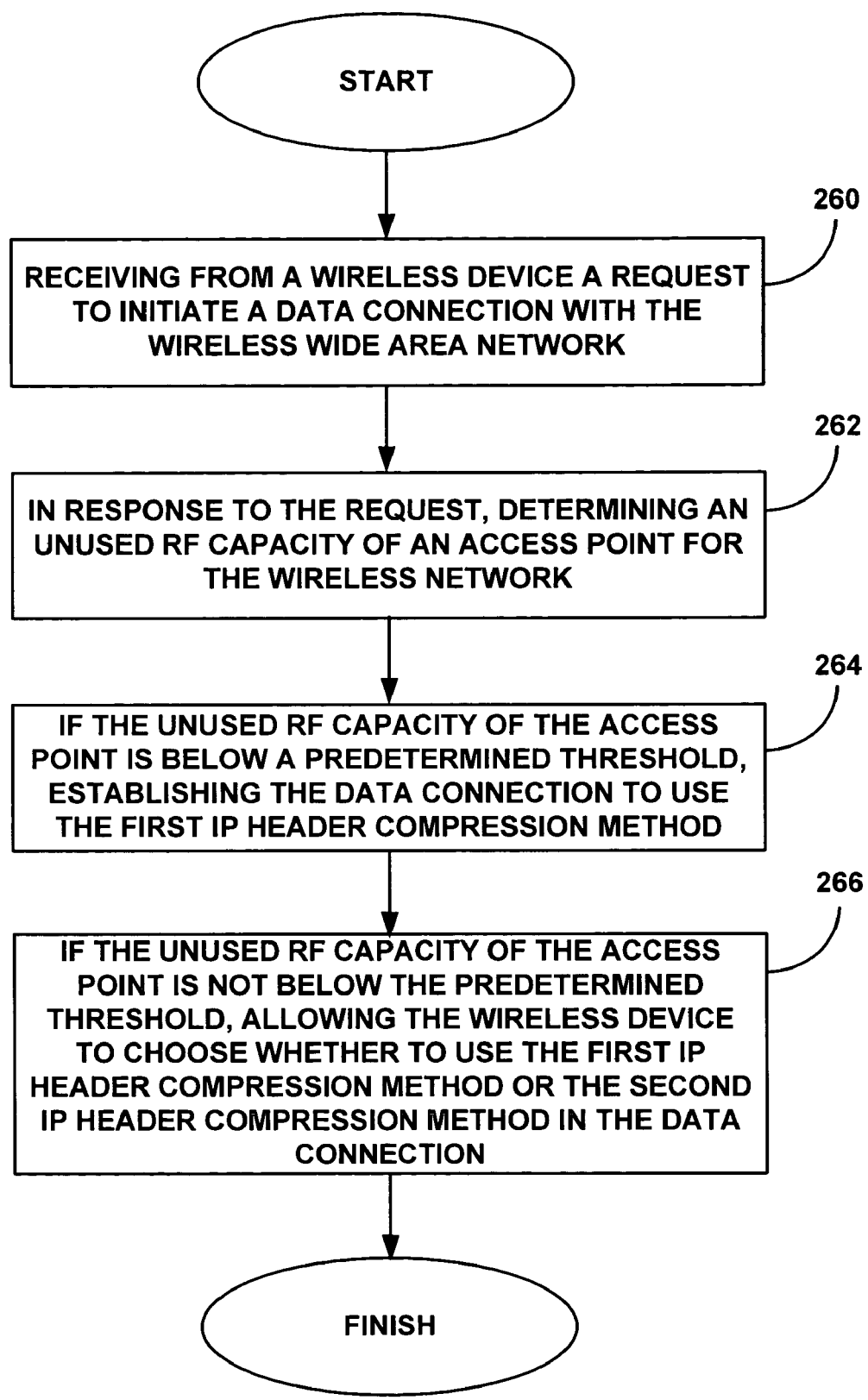
FIG. 7 is a flowchart of an exemplary method for a network element for a wireless network to select between first and second IP header compression methods used in communicating with a wireless device.

FIG. 7 is a flowchart of an exemplary method for network element for a wireless network to select between first and second IP header compression methods used in communicating with a wireless device. In this method, the first IP header compression method again provides a higher level of compression than the second IP header compression method. At Step 260, the network element receives from a wireless device a request to initiate a data connection with the wireless network. In response to the request, the network element determines an unused RF capacity of an access point for communicating with wireless devices, as shown at Step 262. As previously described, the unused RF capacity might be an amount of bandwidth left for the access point to allocate to wireless devices or it could take some other form.

If the unused RF capacity of the access point is below a predetermined threshold, then the network element establishes the data connection to use the first IP header compression method, as shown at Step 264. That is, the network element can conserve the remaining RF capacity by establishing the data connection to use the more efficient IP header compression method. If the unused RF capacity of the access point is not below the predetermined threshold, then the network element allows the wireless device to choose whether to use the first IP header compression method or the second IP header compression method for IP packets sent as a part of the data connection, as shown at Step 266. The wireless device may base its selection on one or more of the previously described factors, such as the remaining battery life of the wireless device, an application executing on the wireless device or another factor.

In allowing the wireless device to select between the first and second IP header compressions methods, the network element may first make its determination that the unused RF capacity is not below the predetermined threshold. The network element may then send the wireless device a signal indicating that the wireless device should make the selection between the two methods, and in turn the network element can receive that selection from the wireless device. Alternatively, the wireless device may automatically send the network element its preference between the two IP header compression methods without waiting for an explicit indication from the network element. If the network element determines that the unused RF capacity is below the predetermined threshold, then the network element can establish the data connection to use the first IP header compression method regardless of the selection sent from the wireless device to the access point. However, if the network element determines that the unused RF capacity is not below the predetermined threshold, then the network element can establish the data connection to use the method previously indicated by the wireless device. These procedures for the wireless device and the network element to select between the first and second IP header compression methods are merely exemplary in nature, and others may also be used.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams. The claims should not be read as limited to the described order or elements unless stated to that effect.

In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method for selecting between Internet Protocol (IP) header compression protocols for packets sent between a wireless device and a wireless network, the method comprising:
   a wireless access point for the wireless network receiving from the wireless device a request to initiate a data connection with the wireless network;
   in response to the request from the wireless device, the wireless access point determining an unused radio frequency (RF) capacity of the wireless access point;
   the wireless access point receiving from the wireless device an indication of whether to use a Robust Header Compression (ROHC) protocol or an Enhanced Compressed Real Time (EcRTP) protocol for packets subsequently sent between the wireless device and the wireless network as part of the data connection; and
   the wireless access point determining, based on the unused RF capacity, whether to establish the data connection to use the indicated IP header compression protocol or a different IP header compression protocol.

2. The method of claim 1, wherein the wireless device indicates the ROHC protocol when a battery level of the wireless device is greater than a predetermined threshold.

3. The method of claim 1, wherein the wireless device indicates the EcRTP protocol when a battery level of the wireless device is less than a predetermined threshold.

4. The method of claim 1, wherein the wireless device indicates the ROHC protocol when a real-time application initiates the request for the data connection.

5. The method of claim 1, wherein the wireless device indicates the EcRTP protocol when a non-real-time application initiates the request for the data connection.

6. The method of claim 1, wherein the wireless network is a wireless wide area network (WWAN).

7. The method of claim 6, wherein the wireless access point is a base station.

8. A method for selecting between Internet Protocol (IP) header compression protocols for packets sent between a wireless device and a wireless network, the method comprising:
   a wireless access point for the wireless network receiving from the wireless device a request to initiate a data connection with the wireless network;
   in response to the request from the wireless device, the wireless access point determining an unused radio frequency (RF) capacity of the wireless access point;
   the wireless access point receiving from the wireless device an indication of whether to use a Robust Header Compression (ROHC) protocol or an Enhanced Compressed Real Time (EcRTP) protocol for packets subsequently sent between the wireless device and the wireless network as part of the data connection; and
   the wireless access point establishing the data connection to use an IP header compression protocol selected based on the indication and the unused RF capacity.

9. The method of claim 7, wherein the wireless device indicates the ROHC or EcRTP protocol based on a selection by a user of the wireless device.

10. The method of claim 9, wherein the selection by the user selects between operational characteristics of the wireless device.

11. The method of claim 10, wherein the operational characteristics comprise maximum battery conservation and maximum bandwidth conservation.

12. The method of claim 10, wherein the selection by the user is made by the user selecting among intermediate options of the operational characteristics.

13. The method of claim 8, wherein the wireless network is a wireless wide area network (WWAN).

14. The method of claim 13, wherein the wireless access point is a base station.

* * * * *